United States Patent Office 3,248,174
Patented Apr. 26, 1966

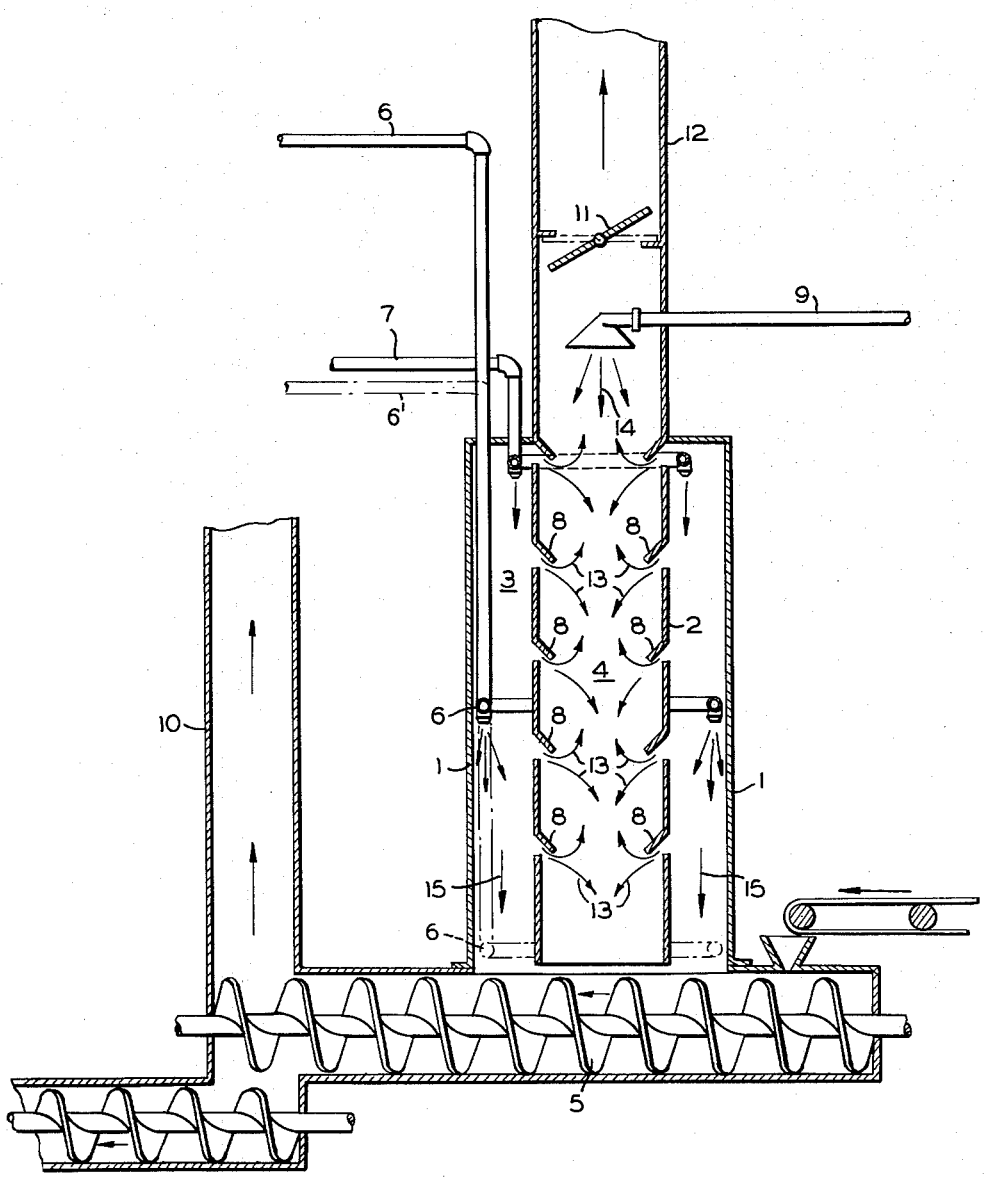

3,248,174
APPARATUS FOR THE PRODUCTION OF HIGH
NITROGEN MATERIALS
Robert E. Pennell, P.O. Box 33, Anderson, S.C.
Filed Dec. 10, 1962, Ser. No. 243,229
8 Claims. (Cl. 23—259.1)

This application is a continuation-in-part of application S.N. 120,115 filed June 1, 1961 and now abandoned.

Reference is also made to pending companion patent application Ser. No. 433,987 filed Feb. 19, 1965 which application is also a continuation-in-part of application S.N. 120,115 referred to above.

This invention has as its object the production of high nitrogen fertilizers or fertilizer materials in which the nitrogen is derived in part or fully from an ammoniating solution in which a part of the total nitrogen is in the form of free, or aqueous ammonia such as an ammoniating solution containing 19% free ammonia, 72.50% ammonium nitrate, and 8.50% water. Sulphuric or other acid is reacted in part or fully with the free ammonia of the ammoniating solution, the ammonia and acid reaction taking place in a separate zone from the ammonium nitrate of the solution from which the free ammonia is at least in part stripped in a continuous process through use of a stripping-reaction column, combining the stripped ammoniating solution and the product of the acid-ammonia reaction with other added materials for completion of reactions. By this procedure, a much stronger acid than that ordinarily used may be employed without a breakdown of an appreciable amount of ammonium nitrate, thus leaving a minimum amount of water to be evaporated or crystallized in hydrated salts as described later.

Much trouble was encountered in early attempts in reacting an ammoniating solution with sulphuric acid in a horizontal revolving cylinder into which the ammoniating solution was simultaneously introduced with the acid through separate perforated pipes extending slightly less than the length of the cylinder. The liquid level in the cylinder was kept as high as possible. Ammoniating solution used at that time contained approximately 20% water, and sulphuric acid employed contained approximately 22% water, yet under these conditions a material amount of the ammonium nitrate was broken down not only giving a serious nitrogen loss, but resulted in a worsened, indefinite product. When a 93% sulphuric acid was used, nitrate breakdown was so severe that the reacting mass often caught fire, and very serious nitrogen losses resulted. In the fertilizer industry, some are now using a somewhat similar procedure through use of a pre-neutralizer which consists of an upright tank into which the ammoniating solution and acid are simultaneously introduced through perforated pipe or sparges near the bottom of the tank. Water is introduced to keep the temperature below the breaking point of the ammonium nitrate, but even then some breakdown of nitrates occur, and fires occur when the concentration gets too high. Accurate control is difficult, and moisture content is necessarily higher than desired. The heat of reaction between acid and ammonia is so great that this reaction in the presence of ammonium nitrate carries the hazard of nitrogen loss through breakdown of ammonium nitrate. Localized action at the points of introduction of the acid and ammonia raises the temperature at these points above the average temperature of the reacting mass with some breakdown of ammonium nitrate at these points. Weaker acid and water addition is necessary to reduce losses from ammonium nitrate decomposition. Starting up a pre-neutralizer gives complications and shut-downs are troublesome.

After much test work, the process as here presented was found to overcome most of the difficulties found in reacting an ammoniating solution containing free ammonia with acid.

The accompanying drawing in cross section illustrative of the equipment and processing comprises of two vertical, circular, concentric columns 1 and 2 forming the stripping section 3 and reaction section 4. The stripping section has two circular, perforated, concentric coils 6 and 7 suspended from top of this section, and the partitioning wall of this section has shielded openings 8 for passage of stripped ammonia into the reaction section. The stripping section is closed at the top, and open at the bottom discharging into mixer 5. The reaction section is open at the bottom discharging into mixer 5, and extends upward into exit stack 12 which has damper 11 for completely closing this stack when down draft is employed, passing vapors through mixer 5 and exhaust stack 10. Exhaust stack 12 may be used when mixer is not provided with an exit stack, or when upward draft from reaction section is desired. Inlet 9 is for introduction and spraying acids into the reaction section in regulated proportions. Ammoniating solution is introduced through perforated coil 6 in regulated proportions in the stripping section 3 where heat from the acid-ammonia reaction in the reaction section strips ammonia vapors from the ammoniating solution, the stripped ammonia passing into reaction section for reacting with the acid being introduced. Arrows 13 indicate flow of volatilized ammonia, arrow 14 indicates descending acid reacting with the ammonia vapors passing into the reaction section, arrow 15 indicates stripped ammoniating solution passing downward into mixer 5 where reaction is completed between any remaining ammonia and the remaining acid coming from the reaction section or with phosphates added to mixer. Solution introduction coil 6 is adjustable up or downward in the stripping section to govern the ammonia stripped from the ammoniating solution, thus governing the proportion of acid-ammonia reaction in the reaction section of the column. Coil 7 is for the introduction of water through a thermostatically controlled valve set at the maximum temperature desired in the reaction section. This coil may also be used for other solutions such as an ammonium nitrate solution when desired. A conveyor is employed for the return of re-cycle fines and other additives into pug type mill or mixer 5 which is provided with an exit stack for vapors and gases, and a screw type conveyor for discharge of the product. The acid and ammoniating solution are continuously introduced in regulated proportions in their respective sections of the columns. The stripped ammonia from the ammoniating solution is regulated in proportion to react with at least half of the acid being introduced into the reaction section.

Since much of the acid-ammonia reaction has taken place in the stripping-reaction columns, a lower temperature is reached in the mixer which is further reduced by additives being introduced in the mixer. The lower temperature in the mixer together with a lower acidic condition has a great advantage over the direct introduction of acid into an ammoniating solution. This is important where nitrates or urea or both are constituents of the ammoniating solutions as well as in the addition of chloride salts in the mixer. These materials give decomposition troubles under high acidic conditions and temperatures.

When exit stack from reaction section is used for removal of vapors by upward draft, an exhaust fan is not required. When using down draft from stripping-reactor through mixer and mixer exit stack, this stack should be provided with an exhaust fan. In either case, draft required is less than one pound reduced pressure per square inch.

Sulphuric and phosphoric acids are employed for reacting with the ammoniating solutions, but by using down draft from the stripping reactor through mixer, more volatile acids may be used.

Ammonium nitrate dissociates at approximately 410 degrees Fahrenheit, but in the presence of acids, the breakdown occurs at a much lower temperature. The temperature in the stripping section should be held below 400 degrees Fahrenheit, and in the mixer where ammonium nitrate or urea enter, the temperature should be held below 300 degrees F. Through use of the stripping-reactor, the acidic conditions in the mixer are dilute since a part of the acid has previously reacted with ammonia from the ammoniating solution.

A much more concentrated acid may be used in the stripping-reactor, than can be used by direct introduction of acid into ammoniating solutions resulting in less water to be eliminated through drying or dehydrating.

By introducing a material containing anhydrous magnesium sulphate into mixer 5 in this processing, the excess water may be crystallized in double or triple salts with water of hydration in the formation of such salts as ammonium magnesium sulphate, potassium magnesium sulphate, if sulphate of potash is present, and probably a complex crystalline formation in which ammonium nitrate takes part, as the products have low hydroscopic qualities. The magnesium sulphate assists in granulation, serves as a dryer and conditioner, and is an additional plant food. Further drying of the products in which it is incorporated is eliminated in most cases. Magnesium sulphate materials now available and suitable for this purpose are: anhydrous magnesium sulphate, anhydrous sulphate of potash-magnesia, anhydrous calcium-magnesium sulphate. By anhydrous as used here includes materials which may not be completely dehydrated to anhydrous, but are satisfactory for use as a crystallizing and drying agent.

Example:

In a particular case, a stripping-reaction ammoniator similar to that previously described was employed. After calibrating and regulating the acid and ammoniating solution feeds, acid and solution were then passed into their respective sections for reacting, and heating the system. Then approximately 1100 parts of ammoniating solution containing 19% free ammonia, 72.50% ammonium nitrate, and 8½% water was introduced into stripping section 3 simultaneously with the introduction of approximately 674 parts of 93% sulphuric acid into reaction section 4. Both solution and the acid were introduced continuously and in proportion for the reaction. The heat of the reaction stripped free ammonia from the solution as it passes through stripping section 3, the volatilized ammonia passed through shielded openings 8 into reaction section 4 where reaction with the descending acid took place, the ammonium-bi-sulphate, ammonium sulphate, and any reacted acid resulting descended into the mixer 5, where it combined with the stripped, or partially stripped ammoniating solution from stripping section 3, and with 300 parts of anhydrous calcium-magnesium sulphate and 100 parts of dolomite which were being continuously introduced and mixed with the products from the two sections of the stripping-reactor. Mixing was continued through crystallizing and setting period. Up draft was employed. Exhaust fan was not required. The product was dry and granular. The nitrogen content was 19.88%. The product also carried approximately 5% magnesium sulphate and 6% calcium sulphate. No appreciable breakdown of ammonium nitrate occurred.

Potassium chloride or potassium sulphate may be introduced as one of the components in the mixer to produce a material containing both nitrogen and potash, or phosphates may be added also to produce a complete fertilizer. When phosphates are used, solution proportion should be adjusted to allow ammonia take up of the phosphates.

By procedure here described concentrated sulphuric acid may be reacted with an ammonia-ammonium nitrate solution to produce a concentrated material of ammonium nitrate, ammonium sulphate, and magnesium sulphate without appreciable break-down of nitrates, and without the necessity of drying by use of anhydrous magnesium sulphate.

When using magnesium sulphate materials derived from olivine, or serpentine, ferrous and ferric sulphates are present in such materials, and on reacting with ammonia or ammonium-bi-sulphate, ammonium sulphate and iron oxide result when such material is added in the final mixing. In proportioning the acid-ammonia ratio as introduced, allowance is made for the ammonia requirement of these acid-reacting iron salts. The iron oxide is beneficial in the final product. It serves as a conditioner as well as retarding moisture absorption, and adherence of granules.

The exit stack from the reaction section may be completely blocked off, and without the use of an exhaust fan. In which case there is a small build-up of pressure in the stripping-reactor from the acid-ammonia reaction, but through regulation of the rate of introduction of the acid and ammoniating solution, and the stripping action by solution coil adjustment in the stripping section, this pressure is held under one pound per square inch.

I claim:

1. A stripping-reaction ammoniator for use in the manufacture of fertilizers in which an ammonia-ammonium nitrate solution is used and in which ammonia vapor is stripped from the solution and reacted with sulphuric acid in a separate zone from the ammonium nitrate of said solution in continuous operation, such stripping-reaction ammoniator being attached to mixer used in fertilizer production and into which mixer the products from the ammoniator are discharged, combined, and mixed, said ammoniator comprising two vertical, circular, concentric columns, the outer column being closed at the top beneath which are attached two circular, perforated pipe coils, the outer coil being used for introduction of the ammoniating solution and is adjustable vertically for regulating stripped ammonia from solution, the inner coil being used for introduction of water through a thermostatically controlled valve set for water introduction at maximum temperature permitted in the reaction section, the inner reaction column connects with an outlet stack at the top and provided with a damper for regulating draft for removal of vapors, a distributor being provided near top of this column through which sulphuric acid is introduced and distributed in its descent through the column such inner column forming a partitioning wall between the stripping and reaction section having shielded openings through which ammonia vapor passes into the reaction section, reacting with the descending acid, the heat of the reaction stripping ammonia from the ammoniating solution being introduced into the stripping section, the bottom of both the stripping and reaction sections being open, and discharging into the connected mixer of the spiral type, propelling re-cycle fines and additives beneath the stripping-reactor in regulated proportions as introduced into said mixer and carried forward for mixing and reacting with products from the stripping-reactor, an exit stack for vapor removal being provided beyond the terminal of the mixing spiral, the ammoniating solution and acid being continuously introduced in regulated proportions into their respective sections.

2. A stripping-reaction ammoniator for use in the manufacture of fertilizers in which an ammonia-ammonium nitrate solution is used, and in which ammonia vapor is stripped from the solution and reacted with phosphoric acid in a separate zone from the ammonium nitrate of said solution in a continuous operation, such stripping-reaction ammoniator being attached to a mixer used in fertilizer production, said mixer being provided with an outlet exhaust stack through which vapors developed in the mixer are exhausted by draft current through mixer to stack, and into which mixer products from the ammoniator are discharged, combined and mixed, said ammoniator comprising two vertical, circular, concentric columns, the outer column being closed at the top beneath which two circular, perforated pipe coils are attached, the outer coil being used for introduction of the ammoniating solution and is adjustable vertically for regulating stripped ammonia from solution, the inner coil being used for introduction of water through a thermostatically controlled valve set for water introduction at maximum temperature permitted in the reaction section, the inner reaction column connects with an outlet stack at the top provided with a damper, a distributor being provided at the top of the column through which phosphoric acid is introduced and distributed in its descent through the column such inner column forming a partitioning wall between the stripping and reaction sections having shielded openings through which ammonia vapor passes into the reaction section reacting with the descending acid, the heat of the ammonia-acid reaction stripping ammonia from the ammoniating solution being introduced into the stripping section, the bottom of both the stripping and reaction sections being open, and discharging into the connected mixer of the spiral type, propelling re-cycle fines and additives beneath the stripping-reactor in regulated proportions as introduced into said mixer and carried forward for mixing and reacting with products from the stripping-reactor, an exit stack for vapor removal being provided beyond the terminal of the mixing spiral, the ammoniating solution and the acid being continuously introduced in regulated proportions into their respective sections.

3. A stripping-reaction ammoniator for use in the manufacture of fertilizers in which an ammoniating solution containing uncombined ammonia as a constituent is used and in which a portion of the ammonia is stripped from the solution and reacted with a concentrated mineral acid in a separate zone from other constituents of said solution in a continuous operation, said stripping-reaction ammoniator being attached to a mixer used in fertilizer production and into which mixer the products from the ammoniator are discharged, combined, and mixed, said mixer being provided with an outlet exhaust stack through which vapors developed in the mixer are exhausted by draft current through mixer to stack, said ammoniator comprising two vertical, circular, concentric columns, the outer column being closed at the top beneath which two circular, perforated pipe coils are attached, the outer coil being used for introduction of the ammoniating solution and is adjustable vertically for controlling stripped ammonia from solution, the inner coil being used for introduction of water through a thermostatically controlled valve set for water introduction at maximum temperature permitted in the reaction section, the inner reaction column connects with an outlet stack at the top provided with a damper, a distributor being provided at the top of this column through which the acid is introduced and distributed in its descent through the column such inner column forming a partitioning wall between the stripping and reaction sections having shielded openings through which ammonia vapor passes into the reaction section reacting with the descending acid, the heat of the acid-ammonia reaction stripping ammonia from the ammoniating solution being introduced into the stripping section, the bottom of both the stripping and reaction sections being open, and discharging into the connected mixer of the spiral type, propelling re-cycle fines and additives beneath the stripping-reactor in regulated proportions as introduced into said mixer and carried forward for mixing and reacting with products from the stripping-reactor, an exit stack for vapor removal being provided beyond the terminal of the mixing spiral, the ammoniating solution and the acid being continuously introduced in regulated proportions into their respective sections.

4. Same as in claim 3 in which the acid employed is of the volatile type in which exhaust stack from the reaction column is completely blocked off by closing the damper in exit stack from reaction section, vapors developed in the stripping-reactor passing down through the mixer and out exhaust stack at mixer terminal, resulting in a pressure build-up in the stripping-reactor from the acid-ammonia reaction, such pressure being controlled at less than one pound per square inch.

5. A stripping-reactor ammoniator in which an ammoniating solution having uncombined ammonia as a constituent and in which a portion of said ammonia is stripped from the solution and reacted with a concentrated mineral acid in a separate zone from other constituents of said solution in a continuous operation, said stripping-reactor ammoniator being attached to a spiral blade mixer used in fertilizer production and into which mixer the products from the ammoniator are discharged, combined, and mixed with additives which are introduced and propelled beneath the stripping-reactor by the spiral blades in regulated proportions, an exhaust stack being provided near mixer terminal having sufficient draft for removal of vapors, said ammoniator comprising two vertical communicating columns divided by a partitioning wall having shielded openings for passage of ammonia vapor, thus forming the stripping column and the reaction column, the stripping column being closed at the top beneath which two perforated introduction pipes are attached, the outer pipe being used for introduction of the ammoniating solution and is adjustable vertically controlling stripped ammonia from solution, the inner pipe being used for introduction of water through a thermostatically controlled valve set for water introduction at maximum temperature permitted in the reaction section, the adjacent reaction column being connected to an outlet stack at the top provided with a damper, a distributor being provided at the top of this column through which the acid is introduced and distributed in its descent through the column, ammonia vaporized in the stripping column passing into the reaction section reacting with the descending acid, the heat of the acid-ammonia reaction stripping ammonia from the ammoniating solution being introduced into the stripping section, the bottom of both the stripping and reaction sections being open and discharge into the connected mixer, the ammoniating solution and the acid being continuously introduced in regulated proportions into their respective columns.

6. The same as claim 5 but specifying that the spiral blade mixer beneath the stripping-reactor discharges direct into conventional equipment in use in fertilizer plants for further processing, eliminating spiral blade mixer terminal exhaust.

7. A stripping-reactor ammoniator in which an ammoniating solution comprises a liquid of substantially uncombined ammonia in which such solution is reacted with a mineral acid, selected from the group of sulphuric and phosphoric acids, in a continuous operation said ammoniator comprising two vertical communicating columns divided by a partitioning wall having shielded openings for passage of volatized ammonia, thus forming the stripping column and the reacting column, the stripping column being closed at the top beneath which two perforated introduction pipes are attached, the outer pipe being used for introduction of the ammoniating solution and is adjustable vertically for controlling volatilized ammonia from solution, the inner pipe being used for introduction of water through a thermostatically controlled valve set for water introduction at maximum temperature permitted in the reaction section, said adjacent reaction column being connected to an outlet stack at the top provided with a damper for regulating draft, a distributor being provided at the top of this column through which the acid is introduced and distributed in its descent through the column, ammonia from the solution volatilizes on being introduced into the stripping section expanding and passing a part of the ammonia through shielded openings into the reaction section, reacting with the descending acid, the stripping column and the reaction column discharging into a spiral blade type mixer to which the columns are attached, mixing and completing the acid-ammonia reaction in the presence of additives and recycles which are being introduced and propelled forward beneath the stripping reactor columns by the spiral blades of said mixer, an auxiliary exhaust stack being provided at mixer exit terminal.

8. Same as claim 7 except that points of ammoniating solution introduction are adjusted for reacting substantially half of the ammonia of the solution in the reaction column, completing acid-ammonia reaction in attached mixer.

References Cited by the Examiner

UNITED STATES PATENTS 1,264,263  4/1918  Brassert _____ 261—111

FOREIGN PATENTS 838,658  6/1960  Great Britain.

MORRIS O. WOLK, *Primary Examiner.*

JAMES H. TAYMAN, Jr., *Examiner.*